3,067,121
FUEL COMPOSITION FOR AQUEOUS HOMOGENOUS NUCLEAR REACTORS
Olle Lindström and Sven Hedman, Vasteras, Sweden, assignors to Allmanna Svenska Elektriska Aktiebolaget, Vasteras, Sweden, a corporation of Sweden
No Drawing. Filed Oct. 15, 1959, Ser. No. 846,537
Claims priority, application Sweden Oct. 25, 1958
3 Claims. (Cl. 204—193.2)

This invention relates to fuel compositions for aqueous homogenous nuclear reactors, the fuel compositions containing special substances which counteract adsorption of fissile material, fission products and possible catalysts on the fertile material.

In a homogenous nuclear reactor the moderator, e.g. heavy or light water, can contain the fissile material mainly in dissolved form and a fertile component mainly in dispersed form. An example of a fuel composition of such a kind is heavy water containing dissolved uranyl sulphate with a high content of active isotopes and dispersed thorium oxide.

In order to obtain a good breeding by using the exemplified fuel composition it is suitable to apply the suspension of thorium oxide in heavy water in a blanket zone round a central core zone, in which the main part of the heat is produced through fission of uranyl sulphate. In a so-called two zone reactor, the core zone and the blanket zone are separated by a tight and pressure-proof wall. The fuel composition is then divided into two separated parts. The two zone reactor offers above everything a good neutron economy, so that the initial charge of fissile material can be kept down. However, great constructive difficulties are connected with this reactor, especially because the wall between the core and the blanket must be pervious for neutrons but yet tight and pressure-proof, so that leakage cannot occur between the two zones, which would be hazardous to the function of the whole reactor. These constructive difficulties do not exist with the one zone reactor, in which fissile and fertile material are homogenously mixed in a single vessel. Owing to the inferior neutron economy of the one zone reactor, however, the chemical reprocessing must be performed more often than in the two zone reactor, in order that the contact of neutron poisons is kept at a low level. Further the reactor vessel and the initial charge of fissile material must be bigger in order that the reactor shall become critical and the desired high conversion ratio be obtained.

Reactor constructions have been suggested in which the advantages of the two zone reactors and the one zone reactors are combined by maintaining a two zone distribution without using a tight and pressure-proof wall. In a reactor of this type a division into two zones is brought about in a single vessel with the aid of centrifugal forces, the heavier suspension of fertile material being brought together at the periphery of the reactor vessel and the solution of the fissile material being concentrated to its more central parts. In another reactor type the suspension of fertile material is kept separated from the solution of the fissile material in the core with the aid of a neutron-pervious wall, which is, however, not tight or pressure-proof. In this last-mentioned type of reactor the suspension of fertile material and the solution of fissile material are in communication with each other as small amounts of the two fluids are conducted to a common chamber. From this chamber the mixture is conveyed to a separating device, in which a division occurs in a solution of fissile material and a suspension of fertile component. The solution is brough back to the inner circuit while the suspension goes back to the outer circuit. Owing to the separating device the desired two zone distribution with the solution of the fissile material in the inner zone and the suspension in the surrounding outer room is produced and maintained. In these two suggested types of reactor the dissolved fissile material, i.e. in the exemplified case uranyl sulphate, is thus at least intermittently in contact with the suspended fertile component, i.e. with the thorium oxide. It is therefore necessary to make the adsorption of the fissile material on the fertile component small, because otherwise the fissile material would follow the fertile component to the outer zone, which would result in the function of the reactors being jeopardized or thwarted. It is also important to make sure that catalysts added to the solution of the fissile material are not adsorbed on the fertile component.

Thorium oxide is not in itself a pronounced adsorbent material. That the adsorption processes still have a very great importance is due to the great amount of thorium oxide, often 250–1250 grams Th per litre, and the proportionately small amount of uranyl sulphate, often 1–10 grams U per litre. Also a proportionately small adsorption, calculated per unit of surface of the active surface of the thorium oxide, can therefore considerably reduce the amount of uranium in the solution. The thorium oxide does not only adsorb uranyl ions but also other ions and molecules occurring in the solution. The adsorption of uranyl sulphate on thorium oxide is dependent on the properties of the thorium oxide and on the composition of the fuel mixture, i.e. the content of uranyl ions, sulphate ions and other cations and anions present, as well as the content of possibly occurring non-ionized material in dissolved or suspended form. The properties of the thorium oxide are in the first place adjusted during manufacture. Thus it is known that e.g. a high calcination temperature gives a larger crystal size which results in a smaller adsorption. During a long operation the thorium oxide is, however, changed under the influence of radiation and erosion. This has the effect that the adsorption increases with the time, so that one cannot trust to thorium oxide manufactured in a suitable way in order to overcome the adsorption problems. It is also known that a pretreatment of the thorium oxide with a solution of elementary sulphur, strongly reduces the uranium adsorption. This method, however, cannot be used in practice because the sulphur adsorbed on the thorium oxide through the treatment is rapidly oxidized to sulphuric acid under the conditions prevailing in the aqueous homogenous reactors.

To fuel compositions for reactors there are usually added certain metal salts which act as catalysts. Thus small amounts of copper salts are addded in order to obtain a catalytical recombination of deuterium or hydrogen and oxygen, which are formed in great amounts through radiolytic decomposition of the moderator. Further iron and/or copper salts or other metal salts belonging to group IB, group VB, or group VIII of the periodic system of the elements are sometimes added in order to obtain a decomposition of hydrogen peroxide which is formed through radiation and which can cause precipitation of uranyl peroxide among all at moderate temperatures and high concentrations of uranyl sulphate. Also these catalyzing salts are adsorbed on the thorium oxide which leads to their effect being impaired. By increasing the concentration of the metal salts in view, especially copper and iron salts, the adsorption of uranyl sulphate on the thorium oxide can be counteracted, but this method is not possible in practice because it has been found that these salts have a neutron adsorption cross section which is not negligible. On the contrary it is desirable to keep the totally added amount of these salts as low as possible and so to make them as effective as possible as catalysts. In order to reach this result their adsorption on the thorium oxide has to be prevented as extensively as possible. In order to counteract hydrolysis of uranyl sulphate and prevent phase separation, sulphuric acid is also added to the fuel composition. An addition of sulphuric acid in addition to that required to counteract the mentioned courses, decreases the adsorption of uranyl sulphate somewhat but simultaneously brings about risks of increased corrosion and for that reason such a method of influencing the adsorption decreases reliability in operation.

It has now proved possible to counteract the adsorption of fissile material and catalyzing salts on the fertile component without getting unpropitious secondary effects and to manufacture fuel compositions with desired properties. According to the present invention such fuel compositions are characterised in that, besides fissile material, fertile component and possible catalyzing salts, they contain one or more salts of at least one of the metals beryllium, magnesium and aluminium. The metal salts can be added individually or as a mixture of two or more in different proportions.

For the combinatin uranyl sulphate-thorium oxide, the mentioned salts suitably can consist of sulphates.

Besides the mentioned salts having an extraordinary capacity for counteracting an undesired adsorption of fissile material and catalyzing salts on the fertile component, it has been proved that the combination of properties they possess for the rest makes them especially suitable for the intended purpose, among others in comparison with other metal salts.

It has thus proved possible to vary the amounts of the salts within wide limits without getting harmful secondary effects. Often it is suitable to use an amount within the range 0.1–10 grams free metal ion calculated per gram uranium. However, one must of course relate the amounts to the circumstances prevailing in each particular case. With adverse conditions, e.g. if a thorium oxide with unusually strong specific adsorption for uranyl sulphate is used, the amount may be higher. The upper limit is determined by the constitutional diagram for each special system in such a way that the addition of the salts is not greater than that allowing the homogeneous state to be maintained in the solution of the fissile material. Another advantage of the fuel composition according to the invention is that the added salts make possible a direct extraction of the uranium 233 which is formed in the thorium oxide by neutron capture. The radiation in the reactor stimulates the diffusion of uranium 233 in the thorium oxide particle. When the uranium 233 is diffused out to the surface of the thorium oxide particle the uranyl ion formed there is eluated from the surface and dissolves. In the two reactor constructions mentioned earlier, the centrifugal reactor and the reactor with the outer separating circuit respectively, this uranium is transported out in the core zone liquid so that in this way a fuel cycle is formed in the reactor system itself with direct transport of newly-manufactured uranium 233 from the fertile component to the fuel zone. This transport is made possible due to the fact that the fuel composition contains these metal salts with desorbing effect, because otherwise the uranyl ion to a large degree would remain in the blanket still adsorbed on the surface of the thorium oxide particle.

The adsorption preventing salts according to the invention also show other good and important properties. On radiation in the reactor thus they give only short-lived isotopes and therefore further risks are not introduced besides those always connected with the inevitable radioactive fission products. No do the daughter products show any harmful secondary effects of importance and so the fuel solution need not be purified with respect to such complications. Further the solutions of the salts are stable. As the salts have only one valency level they cannot take part in oxidation and reduction courses which removes the risk of secondary effects. Nor does the presence of the salts complicate an eventual isolation or preparation in the pure state of the fissile material from the fuel composition.

The part of the fuel composition being distributed to the core zone can contain from about 0.5 to about 50 grams, generally from about one to about 10 grams per litre of uranium in the form of uranyl sulphate and from about 0.01 to about 50 grams, preferably from about 0.1 to about 10 grams per litre of at least one metal ion selected from the group consisting of beryllium, magnesium and aluminium ions. The part of the fuel composition being distributed to the blanket zone can contain from about 20 to about 2000 grams, generally from about 250 to about 1250 grams, per litre of thorium in the form of the thorium oxide and from about 0.1 to about 100 grams, preferably from about one to about 50 grams, per litre of at least one metal ion selected from the group consisting of beryllium, magnesium and aluminium ions. Of course some thorium oxide occurs in the core liquid and some uranyl sulphate in the blanket liquid. The concentration of sulphuric acid often lies at about 0.1 to 10 grams per litre and the concentration of the mentioned catalyzing salts at about a few grams per litre.

*Example 1*

The example relates to an earlier briefly described reactor of the type which is provided with a connection between an inner core zone and an outer blanket zone which are separated from the rest by a neutron pervious wall which is, however, not tight or pressure proof.

The most important data for the reactor are clear from the following disposition.

| | |
|---|---|
| Core, inner size | A cylinder with a diameter of 150 cm. and a height of 300 cm. |
| Core, volume (connection tubes enclosed) | 7 m.$^3$ |
| Pressure vessel, total volume | 25 m.$^3$ |
| Pressure vessel inner size (reactor vessel) | A cylinder with a diameter of 300 cm. and a height of 150 cm. provided with spherical calottes. |
| Pressure vessel, blanket volume | 18 m.$^3$ |
| Operation pressure | 105 kg./cm.$^2$ |
| Inlet temperature | 250° C. (min. 240° C.). |
| Outlet temperature | 280° C. (max. 300° C.). |
| Average specific power: | |
| Core | 57 kw./litre. |
| Blanket | 8.3 kw./litre. |
| Calculated effect, max.: | |
| Core | 400 mw. |
| Blanket | 150 mw. |
| Critical concentration in the core | 1 gram U–235 per litre. |
| Concentration of fertile material (ThO$_2$) in the blanket | 1000 grams Th per litre. |

Adsorption of fissile material, uranyl sulphate, as well as of added copper sulphate catalyst on thorium oxide is in this case prevented by the addition of beryllium, magnesium and aluminium salts and through this addition the total amount of added fissile material can be kept down on the same level as in the corresponding two zone reactor with one core and one blanket circuit totally separated from each other. As is introductorily mentioned, this reactor contains two main circulation circuits designated the inner and outer circuit respectively. In addition auxiliary circuits for start, emergency shut-down, etc. are incorporated. By manufacture of the fuel composition the reactor system is at first filled with heavy water, and circulation pumps etc. being integral parts of the system are started. After addition of deuterium sulphate to the inner circuit a concentrated suspension of thorium oxide is gradually fed to the outer circuit. Thanks to the outer separating device being an integral part of the system the thorium oxide will not be transferred to the inner circuit. Superfluous heavy water is removed by degrees by drawing off from the inner circuit or by evaporation. The concentration of the thorium oxide finally amounts to 1000 grams Th per litre. Then a solution containing beryllium, magnesium or aluminium salts, e.g. a solution of beryllium sulphate in heavy water, is added. The addition is interrupted when the concentration of dissolved beryllium sulphate in the inner circuit corresponds to 1 gram Be per litre. The concentration in the blanket circuit is dependent on the adsorption properties of the used thorium oxide. It can have the value 2–3 grams Be per litre, in which amount is also included that adsorbed on the thorium oxide. In the next step a solution of copper sulphate is added to the inner circuit until the concentration amounts to 1.14 grams Cu per litre in this circuit. The reactor is then heated to operation temperature with high pressure steam fed on the secondary side of heat exchangers being integral parts of the system. Heavy water is continuously removed from the system by evaporation during the heating period so that the total volume is maintained unchanged. The concentration of beryllium and copper is controlled by frequent analyses and eventual final adjustments are made. Further the reactor system is controlled with respect to tightness etc. Finally the addition of highly enriched fissile material in the form of a concentrated uranyl sulphate solution in heavy water occurs. Of the uranium 90 percent is U–235 or U–233. This addition occurs very slowly and one portion at a time to the inner circuit. By frequent analyses it is controlled that the uranium stays in the inner circuit. If uranium should be adsorbed on the thorium oxide to an appreciable degree so that the concentration becomes higher than 0.1 gram U per litre in the outer circuit, further addition of beryllium sulphate occurs until the concentration of uranium does not exceed the mentioned level. The addition of uranyl sulphate is continued until the reactor becomes critical which, in this case occurs at about 1 gram U per litre in the inner circuit. The fuel composition for this reactor will in the inner circuit contain 1 gram U per litre, 1 gram Be per litre, 1.14 grams Cu per litre, 0.2 gram $D_2SO_4$ per litre and in the outer circuit contain 1000 grams Th per litre, 0.1 gram $D_2SO_4$ per litre, 2–3 grams Be per litre and small amounts of uranium and copper. The thorium oxide in addition contains a solid catalyst, suitably 0.6 percent molybdenum trioxide.

*Example 2*

This example refers to the same reactor and fuel composition as described in Example 1 but magnesium sulphate is used instead of beryllium sulphate to counteract the adsorption of fuel on the fertile material. Magnesium sulphate is added until the core fluid contains approximately 1 gram U per litre, 0.5 gram Mg per litre, 1.14 grams Cu per litre and 0.2 gram $D_2SO_4$ per litre.

*Example 3*

The same reactor and fuel composition are used as in Example 1 but aluminium sulphate is used instead of beryllium sulphate to counteract the adsorption of fuel on the fertile material. Aluminium sulphate is added until the core fluid contains approximately 2 grams Al per litre.

*Example 4*

The same reactor and fuel composition are used as in Example 1 but a mixture of beryllium sulphate and magnesium sulphate is used instead of beryllium sulphate to counteract the adsorption of fuel on the fertile material. Beryllium sulphate and magnesium sulphate are added until the core fluid contains 0.5 gram Be per litre and 0.2 gram Mg per litre.

*Example 5*

The same reactor and fuel composition are used as in Example 1 but instead of beryllium sulphate a mixture of beryllium sulphate and aluminium sulphate is used to counteract the adsorption of fuel on the fertile material. Beryllium sulphate and aluminium sulphate are added until the core fluid contains approximately 0.5 gram Be per litre and 0.5 gram Al per litre.

*Example 6*

The same reactor and fuel composition are used as in Example 1 but a mixture of magnesium sulphate and aluminium sulphate is used instead of beryllium sulphate to counteract the adsorption of fuel on the fertile material. Magnesium sulphate and aluminium sulphate are added until the core fluid contains 0.5 gram Mg per litre and 0.1 gram Al per litre.

*Example 7*

The same reactor and fuel composition is used as in Example 1 but instead of beryllium sulphate a mixture of berylium sulphate, magnesium sulphate and aluminium sulphate is used to counteract the adsorption of fuel on the fertile component. Beryllium sulphate, magnesium sulphate and aluminium sulphate are added until the core fluid contains 0.2 gram Be per litre, 0.2 gram Mg per litre and 0.2 gram Al per litre.

*Example 8*

The same reactor and the same core fluid as in Example 1 are used. The blanket fluid, however, contains instead of the thorium oxide, suspended natural uranium dioxide in an amount of 500 grams U per litre. Beryllium sulphate is added in the described manner until the core fluid contains approximately 1 gram Be per litre, 1.14 grams Cu per litre and 0.2 gram $D_2SO_4$ per litre.

If among the metal salts we have found the sulphates to be especially suitable, it is also possible to use metal salts with other negative ions, among other nitrates and fluorides.

The invention can also be applied to other combinations of fissile and fertile materials than those described when one wishes to counteract an adsorption of the fissile material on the fertile material. Such a combination is dissolved uranyl sulphate and thorium oxide exposed in the form of rings, slugs, pellets, etc. Other combinations are e.g. such ones with fissile materials consisting of plutonium compounds and fertile materials consisting of uranium oxides. The invention is not limited to a case where the fissile material consists of only one chemical compound and the fertile material also of only one chemical compound. Both these materials can also consist of mixtures of active constituents.

We claim:

1. An aqueous nuclear reactor fuel composition which is distributed in the reactor and includes a core zone fluid and a blanket zone fluid which are at least intermittently in contact with each other, said core zone fluid containing from about 0.5 to about 50 grams of uranium per litre in the form of uranyl sulphate, and from about 0.01 to about 50 grams per litre of at least one metal ion selected from the group consisting of beryllium, magnesium and aluminium ions, said blanket zone fluid containing from about 20 to about 2000 grams per litre of thorium in the form of thorium oxide, and from about 0.1 to about 100 grams per litre of at least one metal ion selected from the group consisting of beryllium, magnesium and aluminium ions.

2. An aqueous nuclear reactor fuel composition which is distributed in the reactor and includes a core zone fluid and a blanket zone fluid which are at least intermittently in contact with each other, said core zone fluid containing from about one to 10 grams per litre of uranium in the form of uranyl sulphate, and from about 0.1 to 10 grams per litre of at least one metal ion selected from the group consisting of beryllium, magnesium and aluminium ions, said blanket zone fluid containing from about 250 to about 1250 grams per litre of thorium in the form of thorium oxide, and from about one to about 50 grams per litre of at least one metal ion selected from the group consisting of beryllium, magnesium and aluminium ions.

3. An aqueous nuclear reactor fuel composition distributed in the reactor and including a core zone fluid and a blanket zone fluid which are at least intermittently in contact with each other, said core zone fluid containing a dissolved fissile material selected from the group consisting of uranium and plutonium compounds and from about 0.01 to about 50 grams per litre of at least one metal ion selected from the group consisting of beryllium, magnesium and aluminum ions, said blanket zone fluid containing a fertile material selected from the group consisting of uranium and thorium oxides and from about 0.1 to about 100 grams per litre of at least one metal ion selected from the group consisting of beryllium, magnesium and aluminum ions.

References Cited in the file of this patent

UNITED STATES PATENTS 2,820,753     Miller et al. _____ Jan. 21, 1958

OTHER REFERENCES

AEC Document CF–54–6–180, June 23, 1954.
International Conf. on Peaceful Uses of Atomic Energy, 1955, vol. 3, pp. 175–187.